United States Patent [19]

Martin

[11] Patent Number: 4,483,375
[45] Date of Patent: Nov. 20, 1984

[54] GREASE GUN FILLER

[76] Inventor: Jose L. Martin, Farallon No. 60, Playas de Tijuana, Seccion Cost de Oro, Tijuana, Baja California, Mexico

[21] Appl. No.: 380,106

[22] Filed: May 20, 1982

[51] Int. Cl.³ .............................................. B65B 6/12
[52] U.S. Cl. .................................... 141/27; 141/259; 184/105 A
[58] Field of Search ............................... 141/2, 18–27, 141/250–284; 74/89.15; 92/33; 184/105 R, 105 A, 105 B, 105 C

[56] References Cited

U.S. PATENT DOCUMENTS

| | | | |
|---|---|---|---|
| 2,224,509 | 12/1940 | Canine | 221/78 |
| 2,277,437 | 3/1942 | Hultgren et al. | 221/47.5 |
| 2,443,981 | 6/1948 | Funk et al. | 226/125 |
| 2,660,491 | 11/1953 | Sundholm | 309/4 |
| 2,726,802 | 12/1955 | Jones | 226/125 |

FOREIGN PATENT DOCUMENTS 1228986 3/1960 France .................................. 141/27

Primary Examiner—Houston S. Bell, Jr.
Attorney, Agent, or Firm—Brown, Martin & Haller

[57] ABSTRACT

A grease gun filler apparatus for filling grease guns from cylindrical shipping containers comprises upper and lower clamping frame members for clamping the upper frame member to the open top of a grease container and having a piston for engaging the inner walls of the grease container with a threaded actuating shaft engaging a bore in a threaded barrel in the upper clamping frame member and operable upon rotation for forcing the piston downward into the container for pressurizing the grease in the container. A grease gun filling port is formed in the piston to one side of the actuating shaft and includes a threaded bore for receiving the end of a grease gun for filling.

7 Claims, 3 Drawing Figures

GREASE GUN FILLER

BACKGROUND OF THE INVENTION

The present invention relates to dispensing apparatus and pertains more particularly to apparatus for dispensing grease from an original shipping container to a grease gun.

Small hand actuated grease guns are widely used throughout the world for greasing the machinery of industry and agriculture. These grease guns typically hold between a pint and a quart of grease and in many instances must be frequently refilled. Such grease guns are typically refilled from five gallon shipping containers by means of a paddle-like apparatus or by the hand. Such techniques for filling grease guns have numerous drawbacks. Besides being messy and dirty, such techniques typically leave air pockets within the grease gun, resulting in an interruption of operation and a frequent waste of grease.

Some grease gun filler apparatus for filling grease guns from containers have been proposed in the past. Typical of such, as illustrated in the prior art, are shown by the following U.S. patents:

U.S. Pat. No. 2,224,509 issued Dec. 10, 1940 to Canine.

U.S. Pat. No. 2,277,437 issued Mar. 24, 1942 to Hultgren et al.

U.S. Pat. No. 2,443,981 issued June 22, 1948 to Funk et al.

U.S. Pat. No. 2,660,491 issued Nov. 24, 1953 to Sundholm.

U.S. Pat. No. 2,726,802 issued Dec. 13, 1955 to Jones.

The Canine and Jones Patents disclose similar apparatus which utilize a piston acting within a container with the piston actuated by a ratcheting mechanism operated by a lever for forcing grease through an elongated tube into a grease gun.

The Hultgren et al Patent discloses a grease gun loading apparatus utilizing a screw mechanism for advancing a piston for forcing grease from a special grease loading container into the grease gun. There is no disclosure or suggestion of how the grease gun filler apparatus is filled from a container.

The Funk et al Patent discloses an apparatus wherein a piston having an elongated tube at the center thereof is forced downward into a container with the grease gun attached to the upper end of the tube for forcing grease from the container into the grease gun.

The Sundholm Patent discloses a tubular apparatus that extends to the bottom of a container to which a grease gun is attached for drawing grease from the container. A follower piston is placed within the container that follows the level of the grease as it lowers in the container.

These proposed devices have not been entirely satisfactory for various reasons. It is therefore desirable that an improved apparatus be available for loading grease guns from grease shipping containers.

SUMMARY AND OBJECTS OF THE INVENTION

It is therefore the primary object of the present invention to provide an improved grease gun filler for filling grease guns from shipping containers.

In accordance with the primary aspect of the present invention, a grease gun filler includes a clamping apparatus for clamping to an open container with and a piston for fitting in the container including an opening for attachment of the grease gun to be filled and a screw and nut actuating device for applying a force for movement of the piston into the grease containing for forcing grease into the grease gun.

BRIEF DESCRIPTION OF THE DRAWINGS

The above and other objects and advantages of the present invention will become apparent from the following description when read in conjunction with the drawings wherein.

DETAILED DESCRIPTION OF A PREFERRED EMBODIMENT

Figure 1:
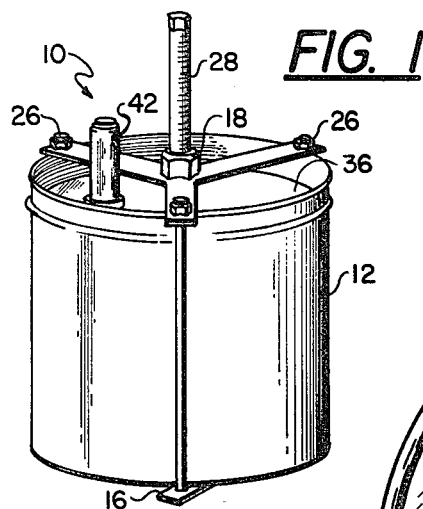
FIG. 1 is a perspective view of the preferred embodiment of the invention shown in use.
Figure 2:
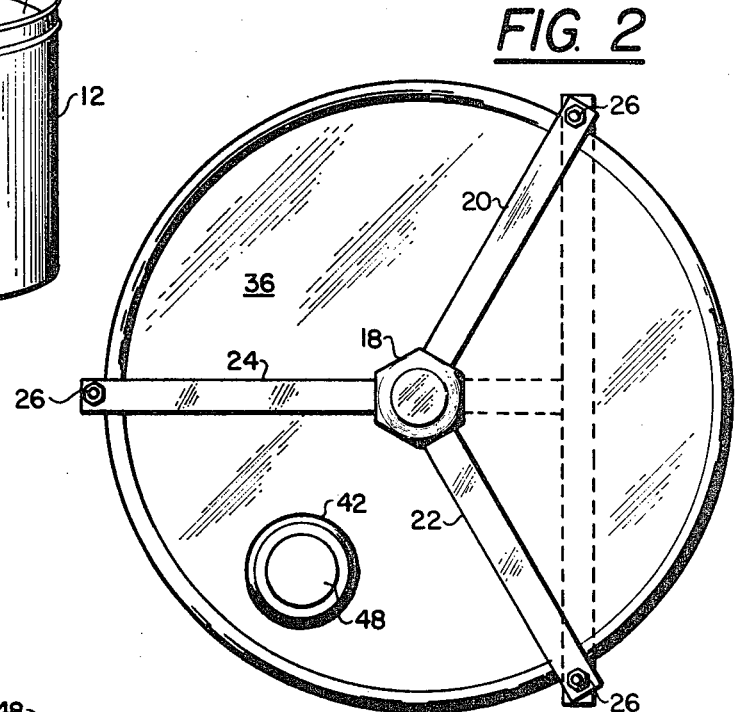
FIG. 2 is a top plan view of the apparatus of FIG. 1.
Figure 3:
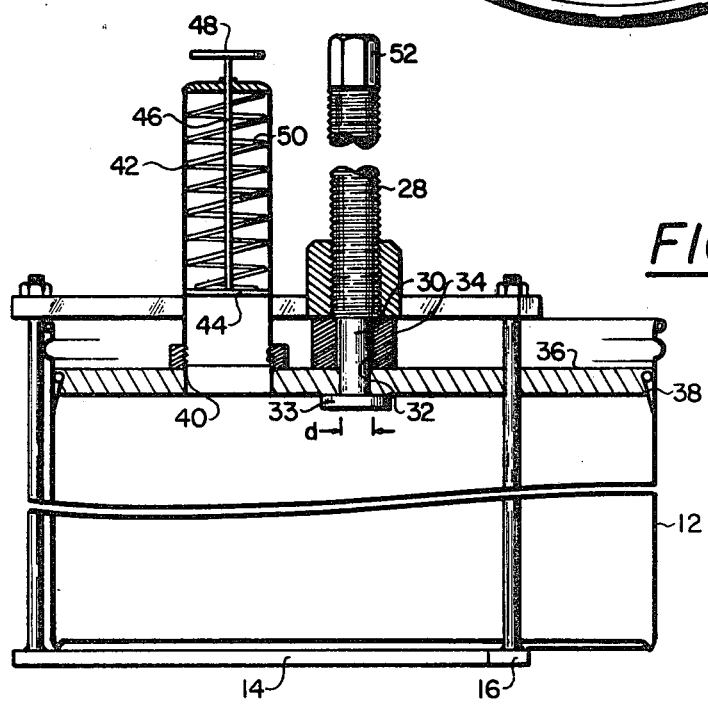
FIG. 3 is a side elevation view in section of the apparatus of FIG. 1.

Turning to FIG. 1, there is illustrated a grease gun filling apparatus in accordance with the invention designated generally by the numeral 10. The apparatus is shown clamped on to a typical grease shipping container 12 which is typically on the order of about five gallons in capacity and is provided with a sealed on but removable top. Larger or smaller containers may be utilized, but the five gallon size is typical of those widely used today.

The filler apparatus comprises a framework which is clamped to the bucket with a base clamp member 14 having a generally T-configuration with the leg and cross arms extending beyond and terminating outside the diameter or outer surface of the container. A top clamp member includes a central barrel member 18 secured to a frame member with three arms 20, 22 and 24 extending radially outward therefrom with equal angles between the arms. The central barrel member may be formed of a conventional hexagonal nut with arms welded to and extending outward from separate ones of the flat faces of the nut. These arms extend outward beyond the outer surface of the container and register with the outer ends of the base clamp member 14, 16. A plurality of bolts 26 are extended through holes in the upper and lower base clamp plates and include nuts which may be tightened to clamp the container between the upper and lower clamping plates.

A threaded shaft 28 threadably engages the bore of the barrel member 18 extending downward and includes a journal lower end 30 extending into a cylindrical bore 32 of a bearing member 34 formed on and extending upward from the center of a piston 36. The bearing member 34 preferably has a height H that exceeds the diameter D thereof by about three times. This height to diameter helps maintain alignment and prevents canting of the piston 36 during pressurization of the grease within the container. The bottom of the bore includes a thrust plate 33 tha also acts as a thrust bearing for the end of the shaft 28.

The piston 36 may be of any suitable, substantially rigid, material such as heavy gauge aluminum, plate steel or the like having sufficient rigidity to withstand the forces necessary to force the grease into the grease gun. The piston has a diameter just slightly less than that of the inner wall or surface of the container 12 and is provided with annular seal means 38 for sealingly engaging the inner wall of the container.

A grease gun filler port 40 is provided with threads for threadably receiving the barrel of a grease gun 42 for filling of the grease gun. The grease gun of a conventional configuration includes a barrel having a cylindrical bore with a piston 44 therein supported on a rod 46 with a handle 48 on the outer end thereof. An elongated coil spring 50 biases the piston 44 toward the forward end of the grease gun barrel pressurizing the grease therein or at lease forcing it to the intake of the grease gun pump.

The shaft 28 is provided with a wrench engaging nut-like upper end 52 to which a wrench is applied for rotation of the shaft. This arrangement permits the selection of wrench length or leverage to be used. For lighter greases a speed handle may be used. For heavier greases a long torque handle may be used.

In use, a new container of grease is selected and the top thereof removed. The container is then placed on the base plate 14, 16 with the top clamp 18 placed in position with the piston 36 positioned within the container with the piston and sealing engagement with the interior walls thereof. The top and bottom plates are then bolted together and the apparatus ready for use. A grease gun to be filled is selected and the barrel thereof removed and placed within the filler port 40 and secured by screwing into place. Thereafter, a wrench is selected and applied to the head 52 of the threaded shaft 28 rotating the shaft for forcing the piston 36 downward against the grease within the container 12. This downward force of the piston 36 pressurizes the grease forcing it out the port 40 into the barrel of the grease gun 42. As the grease gun is filled, the rotation of the shaft 28 is ceased, the grease gun barrel removed and assembled for use. A cap or plug may then be inserted in the filter port 40 for closing the grease container.

While I have illustrated and described my invention by means of specific embodiments, it is to be understood that numerous changes and modifications may be made therein without departing from the spirit and scope of the invention as defined in the appended claims.

I claim:

1. An apparatus for filling a grease gun from an open top shipping container, said apparatus comprising:

a base clamp member for engaging the bottom of a container;

a top clamp member for engaging the top of a container, said top clamp having a plurality of arms extending radially outwardly from a central hub, a barrel having a threaded cylindrical bore mounted at the central hub of said top clamp, a plurality of clamping rods connecting said head clamp member and base clamp member for clamping a container therebetween, a piston having a diameter substantially equal to the inside diameter of a grease shipping container, and including a threaded filler port for receiving a grease gun barrel, seal means for sealingly engaging the walls of said container, and a vertically extending cylindrical bearing mounted on and extending upwardly from the center of said piston, and an elongated threaded shaft rotatably journaled in said cylindrical bearings and threadably mounted in said barrel and axially movable with respect to said head clamp upon rotation thereof for moving said piston against grease in a container for forcing said grease from said container via said filler port.

2. The apparatus of claim 1 wherein said cylindrical bearing has a greater length than diameter for maintaining axial alignment of said piston with said container.

3. The apparatus of claim 2 wherein said top clamp member consists of three arms extending outward from said hub, each arm extending at an equal angle from an adjacent arm.

4. The apparatus of claim 3 wherein said base clamp member has a generally T-configuration with the arms thereof terminating in alignment with the ends of the arms of said top clamp member.

5. The apparatus of claim 4 wherein said threaded shaft has a length exceeding the height of the container.

6. The apparatus of claim 5 wherein said threaded shaft includes a hexagonal wrench engaging upper end for engagement by a wrench for rotation of said shaft.

7. The apparatus of claim 6 wherein said hub is defined by said barrel and said barrel consists of a hexagonal nut and said arms are each welded to and extend outward from a flat side of said nut.

* * * * *